United States Patent

Wainer

[15] 3,647,422

[45] Mar. 7, 1972

[54] RECOVERY OF SILVER, POLYESTER AND AMINO ACIDS FROM PROCESSED FILM

[72] Inventor: Eugene Wainer, Shaker Heights, Ohio

[73] Assignee: Horizons Incorporated, a Division of Horizons Research Incorporated

[22] Filed: July 13, 1970

[21] Appl. No.: 54,092

[52] U.S. Cl. ...................................75/101, 75/118, 204/72, 204/98, 204/151, 204/180 P, 260/117
[51] Int. Cl. .....................................C22b 3/00, C22b 11/00
[58] Field of Search ...............75/101, 118; 204/72, 98, 151, 204/180 P; 260/117

[56] References Cited

UNITED STATES PATENTS

| 1,350,157 | 8/1920 | Horton | 75/118 X |
| 1,582,847 | 4/1926 | MacDonald | 75/118 |
| 1,637,990 | 8/1927 | Ellis et al. | 75/118 |
| 1,669,394 | 5/1928 | Ellis et al. | 75/118 X |
| 3,330,749 | 7/1967 | Kuwata et al. | 204/180 P |

FOREIGN PATENTS OR APPLICATIONS

| 633,685 | 2/1928 | France | 75/118 |
| 331,006 | 6/1930 | Great Britain | 75/118 |

OTHER PUBLICATIONS

Klein, " Cellulose," May, 1930, pp. 114– 118.
Mancher, " Chemical Abstracts," Vol. 25, 1931, pp. 4,809–4,810.
Sramek, " Chemical Abstracts," Vol. 59, 1963, pp. 4,715–4,716.

*Primary Examiner*—Herbert T. Carter
*Attorney*—Lawrence I. Field

[57] ABSTRACT

Recovery of silver, polyester and amino acids from processed silver halide gelatin photographic film.

5 Claims, 1 Drawing Figure

PATENTED MAR 7 1972　　　　　　3,647,422
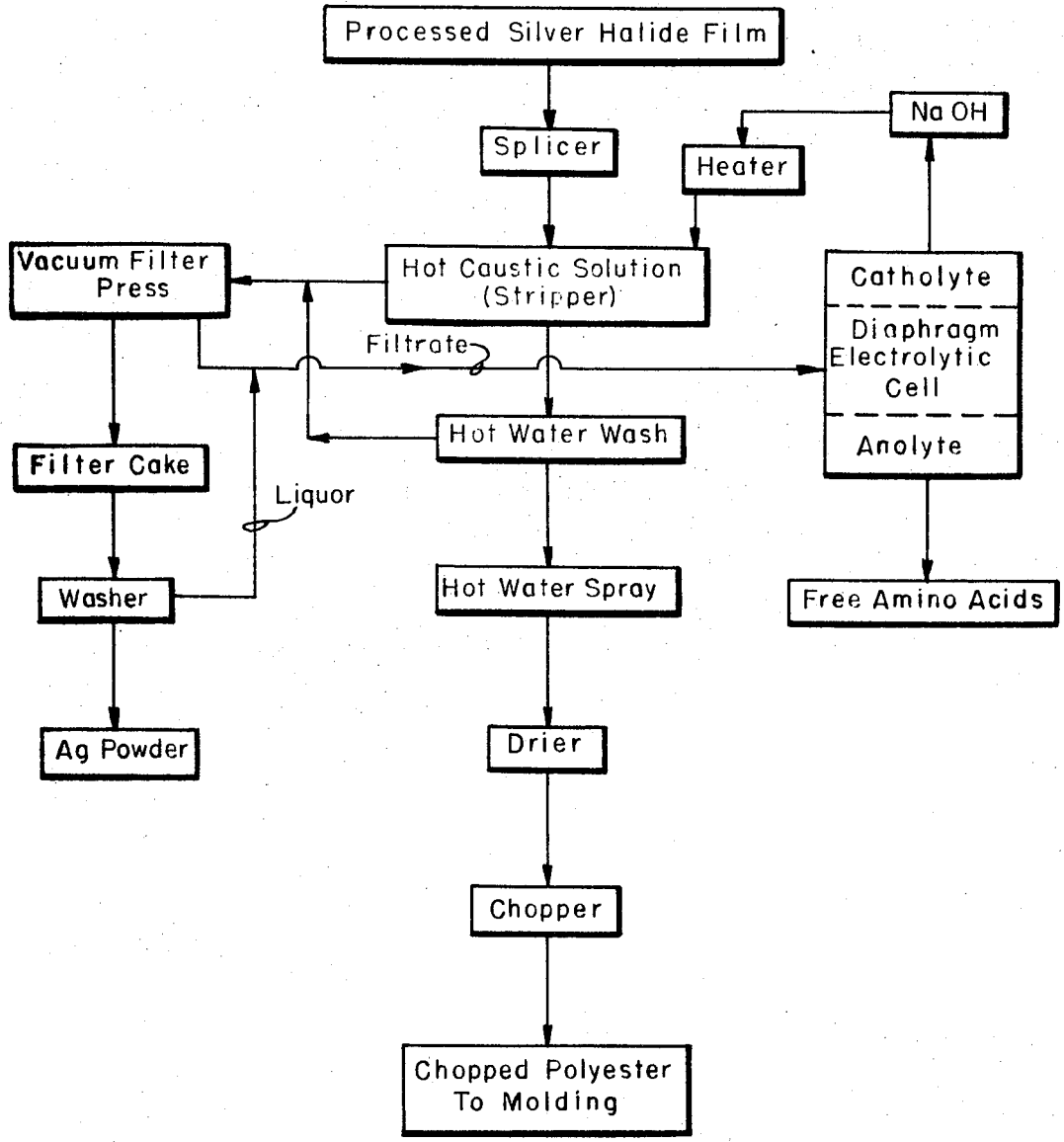
INVENTOR
Eugene Wainer
BY
ATTORNEY

RECOVERY OF SILVER, POLYESTER AND AMINO ACIDS FROM PROCESSED FILM

This invention relates to the recovery of photographic quality silver and of polyester from processed silver halide, gelatin photographic film.

Metallic silver is being used at an annular rate substantially greater than the rate of new silver is being introduced into the marketplace. Substantial quantities of silver are in possession of the United States Government in the form of processed imagery on a polyester base. The majority of the imagery contains sensitive information and while the removal of the silver comprising such imagery is a relatively straightforward process, the information contained in the form of silver grains laid on top of the polyester film base still remains after silver has been removed from the polyester base itself which can be exposed for viewing by illumination with black light. While some portions of this government stored imagery is needed for both archival and security purposes, a much larger proportion might well serve as a raw material, principally for the recovery of photographic grade silver, providing no vestige of security sensitive information remains in any of the byproducts resulting from such silver recovery.

One object of this invention is to achieve the quantitative recovery of silver of purity sufficient that this silver may be used directly as a source of high-purity silver chemicals for the manufacture of high-quality silver halide containing photographic film.

Another object of this invention is to achieve the quantitative recovery of polyester in noninformative form and of quality such that a useful and saleable item of commerce is made available.

Still another object of this invention is recovery of amino acids resulting from complete hydrolysis of gelatin.

Still a further object of the invention is to provide a process for recovery of silver, polyester and amino acids from processed silver halide photographic film, which process involves the recycle and reconstitution of the reagents used for the removal of silver from the surface of the polyester base thereby avoiding pollution of stream and atmosphere and contributing to the overall economics of the process, and to recover a number of valuable byproducts other than polyester which would normally be voided to the sewer.

These and other objects will be specifically pointed out or will be evident from the description which follows taken with the drawing which is in the form of a flow sheet of a preferred procedure for accomplishing the foregoing objectives.

As shown in the flow sheet, polyester film which carries silver imagery on its surface, as a result of photographic processing, enters the process in the form of rolls and/or sheets. To permit continuous operation, the sheets or the ends of successive rolls are spliced together, either by mechanical means, such as sewing or punching and/or rivetting, or by means of a polyester adhesive tape, or by solvent welding or by another method known in the art. The splicing is preferably effected automatically on a flying splicer on the side away from the silver imagery surface, utilizing a hot curing modified polyester material as the adhesive placed on a polyester tape. Splicing in the manner described is to ensure the least amount of possible contamination of the desired polyester end product.

Then utilizing a driven roller system, the continuous film passes through one or more sodium hydroxide baths in which the NaOH concentration ranges between 5 to 15 percent maintained at a temperature of about 80° C. This hot caustic bath dissolves and hydrolyzes the gelatin which is thus left in the solution in the form of the sodium salts of the amino acids of which gelatin is composed and frees the metallic silver in the form of a fine grained suspension. To facilitate the removal of the gelatin surface, either reverse rolls or scraper bars are used on the film as it passes through the hot caustic baths.

After washing thoroughly in hot water and then drying, the polyester, now separated from the imagery, is chopped sufficiently fine so that it can be fed automatically to a controlled atmosphere furnace which melts the polyester. The molten product discharged from this controlled atmosphere furnace is chilled quickly, crushed, pulverized and is then blended with small amounts of catalytic material, after which the mixture is compression molded into strong, corrosion-resistant plastic shapes or manufactured into filament for carpet weaving, pillow stuffing, or furniture stuffing generally.

The liquid from the hot caustic treatment tank contains the dissolved and hydrolyzed gelatin, hot caustic and the silver stripped from the processed photographic film. This liquid is the raw material from which the caustic, the silver and amino acids are to be recovered. This liquid is pumped to a vacuum filter press. The vacuum filter press may be either a rotary filter (preferred) or a plate and frame filter. The materials of construction are such that they will withstand the hot caustic liquor on an indefinite basis. The metallic silver powder filter cake is washed on the press and is scrapped off continuously. The silver so recovered may be used in any desired manner. For example, it may be dried and the dried powder may be converted to small size briquettes weighing approximately 1 oz. each. These briquettes can be melted to produce what is called in the trade a "starting" bar. After melting and casting, the starting bar is used as an anode in an electrolytic refining cycle to produce high purity silver cathodes. These cathodes are again remelted in an induction furnace and cast into ingots. The ingots are analyzed individually to ensure their purity and are used as a raw material for the manufacture of high-purity silver nitrate suitable for the production of silver halide film. Obviously the originally recovered silver powder may be used in many other ways, e.g., as a catalyst, or for production of dental alloys or any other well known uses, forming no part of the present invention.

The filtrate obtained from the vacuum filter press is pumped to a three compartment, diaphragm-type electrolytic cell. The filtrate comprises spent caustic liquor from the vacuum filter press and the sodium salts of the amino acids formed by the hydrolysis of the gelatin. The washings of the silver cake are fed to the central compartment of the cell. When electrolyzed the liquid which passes into the catholyte compartment is caustic of sufficient concentration and sufficient purity that it can be recycled to the hot caustic tanks in which the film is initially treated. This compartment is started with pure water containing a trace of caustic so that it has ample conductivity to enable the process to start. In the anolyte compartment, the amino acids produced as a result of the hydrolysis of the gelatin are collected. The process is started with pure water containing a trace of amino acid in the anolyte compartment. A combination of decomposition products, principally amino acids with some carbonates and a variety of carboxylic acids concentrate in the anolyte cell. The amino acids which collect in the anode compartment are principally glycine, proline, hydroxy proline, alanine and glutamic acid, along with smaller amounts of arginine, aspartic acid, leucine, lysine, serine, valine, threonine, phenylalinine, methionine, histidine, and tyrosine. These amino acids are readily separated by any of a variety of well known techniques, such as fractional crystallization, and the amino acids so recovered are useful as food supplements for animals and human beings, especially as sugar substitutes.

I claim:

1. A process for the recovery of valuable constituents from processed silver halide gelatin film which comprises:
    1. stripping the silver and gelatin from the polyester base supporting said constituents, by wetting said processed film with a caustic solution maintained at an elevated temperature for a time sufficient to detach said constituents from said base;
    2. separating the resulting liquid and suspended silver solids from the stripped base and recovering said base;
    3. filtering the liquid and suspended solids, thereby separating the silver from the liquid, and recovering said silver; and 4. electrolyzing the liquid in a three compartment diaphragm type electrolytic cell and recovering caustic from the catholyte compartment and amino acids from the anolyte compartment, as a result of aid electrolysis.

2. The process of claim 1 including, in addition, washing, chopping and subsequently melting the recovered polyester.

3. The process of claim 1 including washing the recovered silver and returning the wash water to the middle compartment of the electrolytic cell.

4. The process of claim 1 including recirculating the NaOH recovered from the catholyte compartment to strip silver and gelatin from more processed film.

5. The process of claim 1 in which caustic is heated to about 80° C. and stripping is effected by immersing processed film in a bath of caustic at 80° C.

* * * * *